Aug. 22, 1961 R. C. SCHIRING 2,997,585

COMBINED IMAGE AMPLIFIER AND FLUOROSCOPIC SCREEN ABOVE X-RAY EXAMINATION TABLE

Filed July 23, 1958 9 Sheets-Sheet 1

INVENTOR.
RALPH C. SHIRING
BY
Hyde, Meyer, Baldwin & Doran
ATTORNEYS

INVENTOR.
RALPH C. SHIRING
BY
Hyde, Meyer, Baldwin & Doran
ATTORNEYS

INVENTOR.
RALPH C. SHIRING
BY
Hyde, Meyer, Baldwin & Doran
ATTORNEYS

COMBINED IMAGE AMPLIFIER AND FLUOROSCOPIC SCREEN ABOVE X-RAY EXAMINATION TABLE

Filed July 23, 1958 9 Sheets-Sheet 4

INVENTOR.
RALPH C. SHIRING
BY
Hyde, Meyer, Baldwin & Doran
ATTORNEYS

INVENTOR.
RALPH C. SHIRING
BY
Hyde, Meyer, Baldwin & Doran
ATTORNEYS

Aug. 22, 1961 R. C. SCHIRING 2,997,585

COMBINED IMAGE AMPLIFIER AND FLUOROSCOPIC SCREEN ABOVE X-RAY EXAMINATION TABLE

Filed July 23, 1958 9 Sheets-Sheet 6

INVENTOR.
RALPH C. SHIRING
BY
Hyde, Meyer, Baldwin & Doran
ATTORNEYS

INVENTOR.
RALPH C. SHIRING
BY
Hyde, Meyer, Baldwin & Doran
ATTORNEYS

INVENTOR.
RALPH C. SHIRING
BY
Hyde, Meyer, Baldwin & Doran
ATTORNEYS

INVENTOR.
RALPH C. SHIRING
BY
Hyde, Meyer, Baldwin & Doran
ATTORNEYS

United States Patent Office
2,997,585
Patented Aug. 22, 1961

2,997,585

COMBINED IMAGE AMPLIFIER AND FLUOROSCOPIC SCREEN ABOVE X-RAY EXAMINATION TABLE

Ralph C. Schiring, Cleveland, Ohio, assignor to Picker X-Ray Corporation Waite Manufacturing Division, Inc., Cleveland, Ohio, a corporation of Ohio Filed July 23, 1958, Ser. No. 750,531
15 Claims. (Cl. 250—57)

This invention relates to improvements in a combined image amplifier and fluoroscopic screen above an X-ray examination table, including the necessary means for counterbalancing the weight of such equipment for ease of operation by the user.

An object of the present invention is the mounting of a fluorescent screen, for usual examination purposes, above an X-ray examination table, together with an image amplifier, also above the table, both the screen and the amplifier being so constructed and arranged that one may selectively position either the screen or the amplifier in registration above a common patient-viewing position or zone on said table, either the screen or the amplifier being movable into or out of this operative position of registration without interference with the other device.

Another object of the present invention is to so mount a fluorescent screen and image amplifier on a carriage above an X-ray examination table so that the carriage may be moved along the longer dimension of the table, or crosswise thereof, and to be positioned beyond the patient, on the patient-viewing side of the table, in any horizontal or vertical position of the table, where a tilting table is used.

A further object of the present invention is to provide a fluorescent screen, an image amplifier and a film cassette tray, all mounted on substantially registering track means on a carriage above an X-ray examination table, with the parts mounted in such relationship that it permits the screen and the amplifier and the cassette tray, each to pass the others on the supporting tracks so that the operator may examine the patient utilizing the usual fluoroscopic screen, take pictures of any part located on the screen as desired, or examine more specifically a portion of the patient utilizing the image amplifier and thereafter take pictures of such more closely examined part, all with simply the movement of one part of the screen, amplifier and cassette tray along the track means of the carriage, without any delay in the examination of the patient or any delay in taking pictures.

This invention also combines in the apparatus above described an X-ray tube positioned below the examination table and directing its rays upwardly toward a patient-viewing position on the movable carriage above the table, together with an electrical energizing circuit or circuits for such tube including different circuit parameters for use with the amplifier or with the fluoroscopic screen respectively, together with means for automatically shifting from one parameter to the other depending upon whether the amplifier or the fluoroscopic screen is in the forward or patient-viewing position.

This invention also provides means for automatically preventing the energization of the exposure circuit for the X-ray tube located beneath the table unless either the fluorescent screen or the image amplifier is in the patient-viewing position.

This invention also provides an electric motor driven cassette tray, normally arranged to return to a rear position away from the operator but movable to a forward or picture-taking position at the will of the operator, or movable to a forward position for front loading of the cassette, together with a safety arrangement whereby the cassette tray is held in the forward position during a loading operation and is automatically returned to the rearward or inoperative position only when either the amplifier or the fluorescent screen is moved to the forward or patient-viewing position.

Since the above described carriage mounted on a tower or column for movement along the examination table, with the carriage mounting the fluorescent screen and image amplifier and cassette tray and other associated equipment is very heavy, means is provided by this invention to counterbalance the weight of this carriage and its attached parts in all possible horizontal and vertical positions of a tilting examination table.

The above mentioned counterbalancing device contemplates an overhead arrangement including an upper support, a first arm having a pivotal mounting on this support, a second arm pivotally mounted on the free end of the first arm, spring means carried in one of these arms and connected by pulleys and sheaves with the carriage below so that the weight of the carriage and the connected parts is counterbalanced by the spring means in the arm above. These arms are arranged to pivot in such a way as to follow the movement of the carriage on the examination table in all of the positions of the table as mentioned above.

A further object of the present invention is to provide such an overhead counterbalancing device as described in the preceding paragraph so that a ceiling-mounted X-ray tube may be utilized above the table, this tube mounting means above the table and the counterbalancing means, just mentioned, have mutual clearance permitting the tube mounting means to move between positions on opposite sides of the counterbalancing means.

Other objects and advantages of the present invention will be apparent from the accompanying drawings and description and the essential features thereof will be set forth in the appended claims.

In the drawings:

FIG. 14 is a fragmental sectional view, enlarged, taken along the line 14—14 of FIG. 1.

FIG. 15 is an elevational view of the apparatus of FIG. 14 taken from the position of the line 15—15 of FIG. 14; while FIG. 16 is an electrical wiring diagram showing the connection of the X-ray tube control circuits with the mechanism of FIGS. 14 and 15.

Prior to this invention it has been customary, when using an image amplifier in connection with an X-ray examination table, to mount the image amplifier from a ceiling-supported track by proper counterbalancing. The examination table is then supplied with the usual large fluoroscopic screen mounted on a carriage above the examination table for movement both longitudinally and laterally of the table. This fluoroscopic screen is used for ordinary examinations. When the image amplifier is required, it is necessary, with the equipment heretofore in use, to either remove the fluoroscopic screen entirely, or to move it upward on a hinge somewhat over 90 degrees so as to clear the space above the patient, and to then bring the image amplifier down from the ceiling track and clamp it in place above the patient on the table. This is an awkward operation and does not encourage complete use of the image amplifier.

Figure 1:
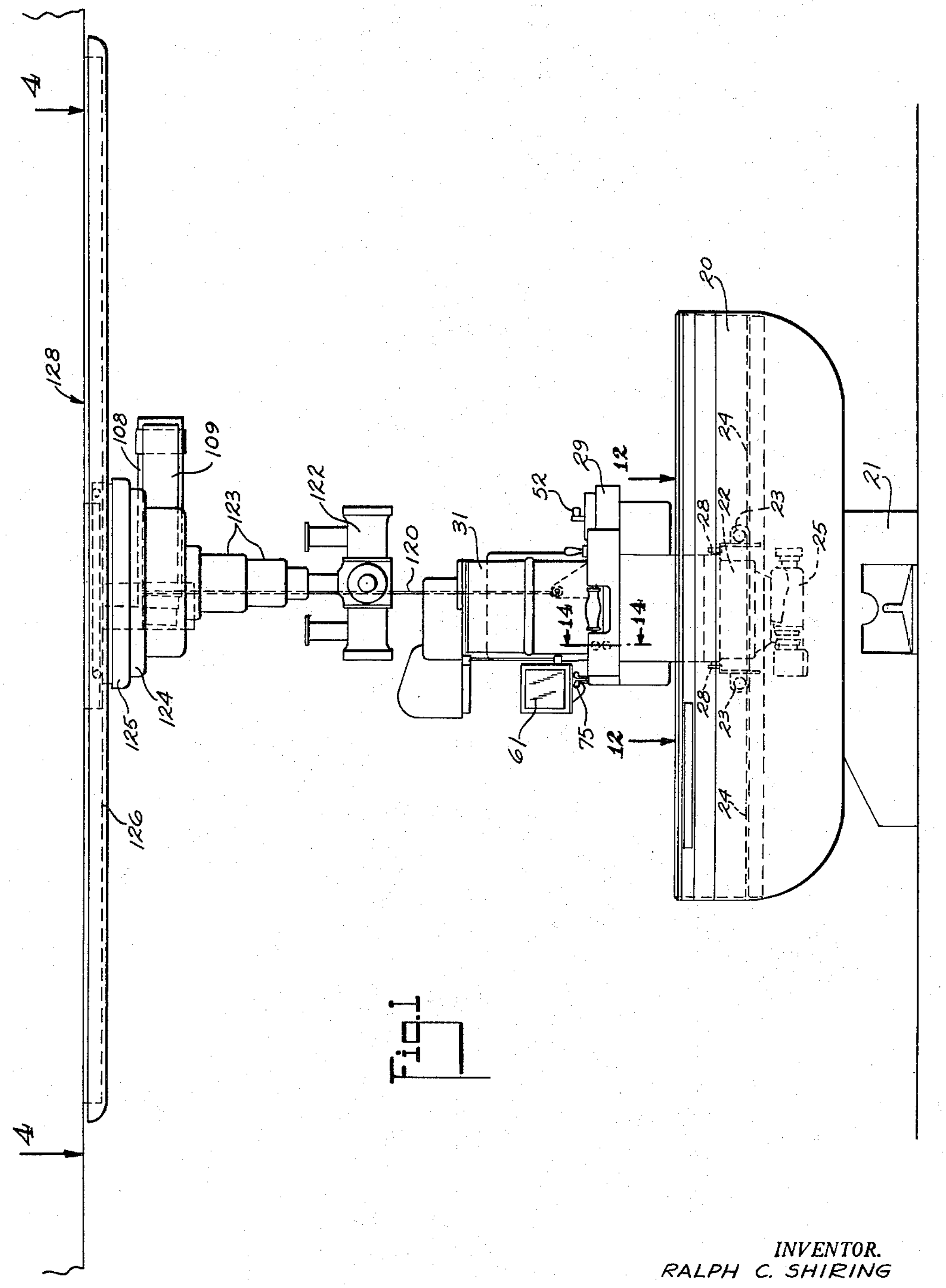
FIG. 1 is an elevational view of an examination table equipped with my invention including the overhead counterbalancing device and ceiling-mounted X-ray tube for use in connection with the examination table whenever desired.
Figure 2:
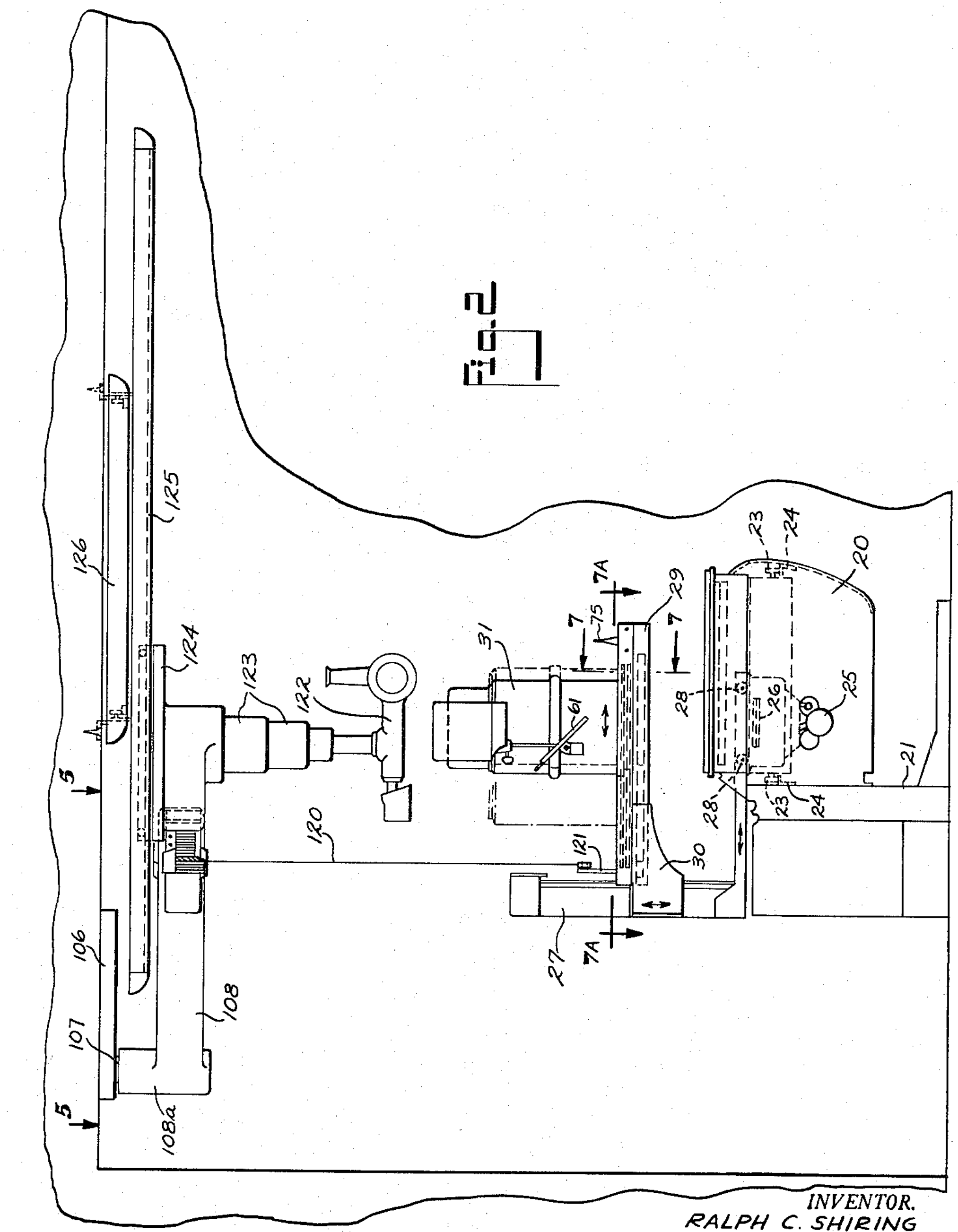
FIG. 2 is an end elevational view of the equipment of FIG. 1.
Figure 3:
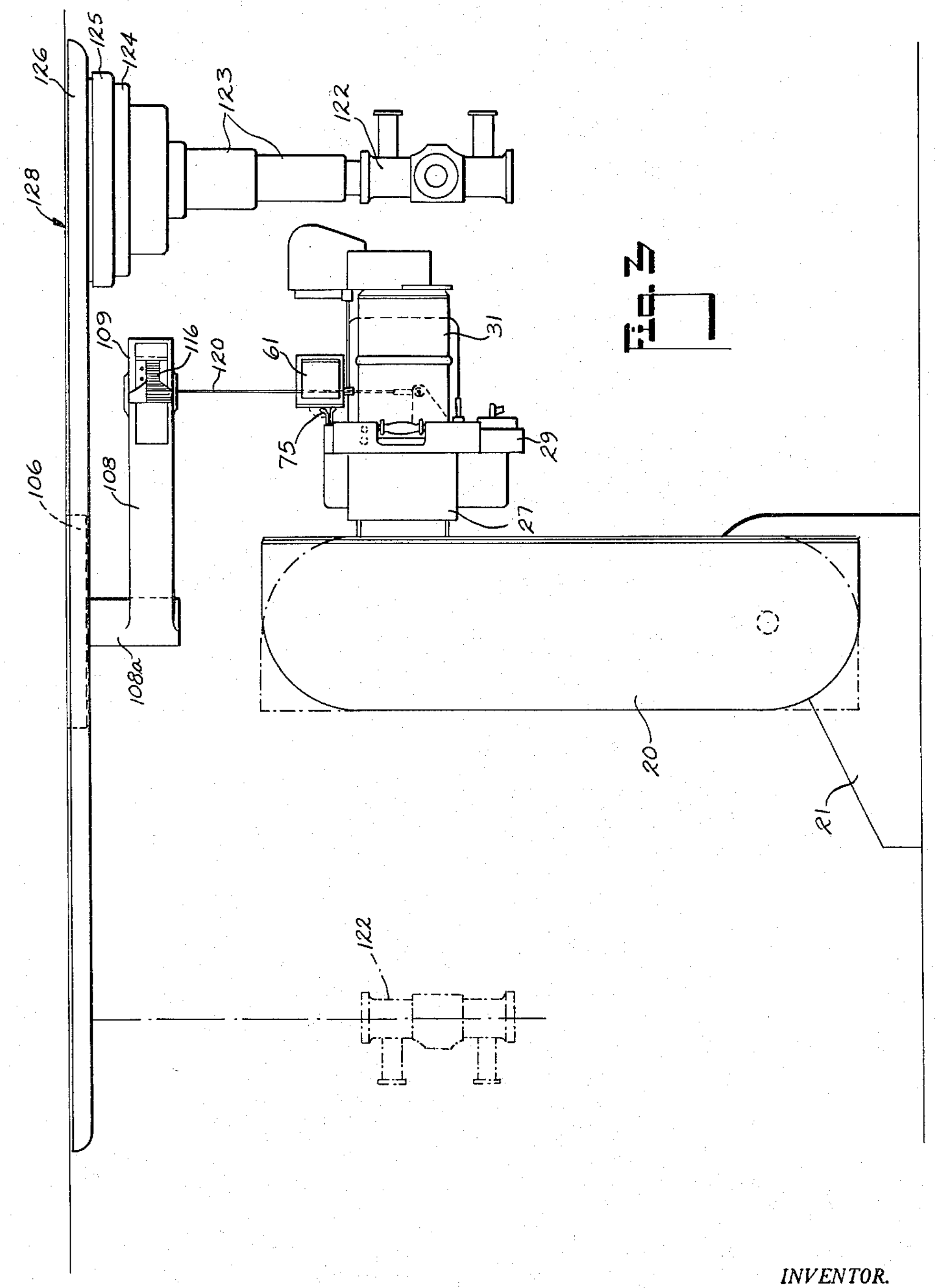
FIG. 3 is a side elevational view of the equipment of FIG. 1 showing the examination table tilted to a vertical position, with the counterbalancing device supporting the weight of the carriage movable along the examination table, and with the overhead mounted X-ray tube moved to one side.
Figure 7:
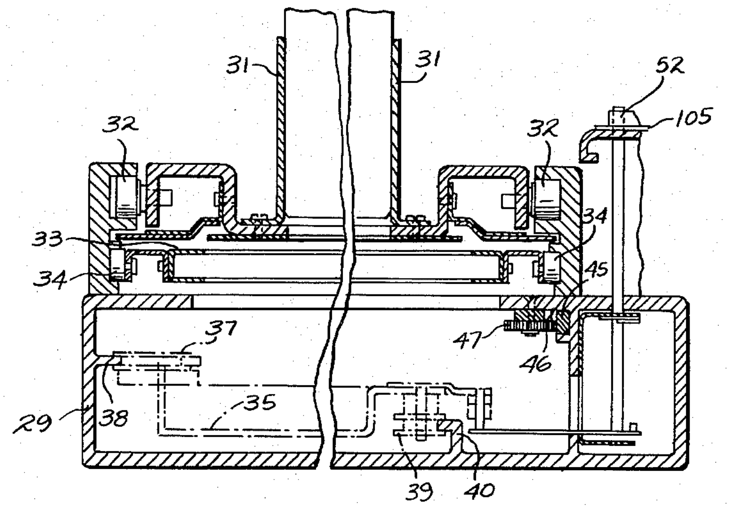
FIG. 7 is a transverse sectional view, enlarged, through the carriage above the examination table, this view being taken along the line 7—7 of FIG. 2 but with the image amplifier in a different location, and also taken along a similarly numbered line in FIG. 7A.

The present invention is shown in connection with an examination table 20 which is pivotally mounted on a base 21 for movement between a horizontal position shown in FIG. 1 and a vertical position as shown in FIG. 3. The table may also be turned to face in either of two directions as shown in FIG. 3 by full lines in one position and dot-dash lines in the other position. Mounted beneath the table top is a carriage 22 which may be moved substantially the entire length of the table by means of rollers 23 which travel upon tracks 24. This carriage 22 serves as a mounting for X-ray tube 25 and for X-ray limiting diaphragms 26 as will presently appear. A tower or column 27 is slidably mounted on carriage 22 by means of rollers 28. Thus the tower 27 has movement both longitudinally and laterally of the examination table. Another carriage 29 has a normal position above the table and is supported on the tower 27 by means of a bracket 30 which is connected with the tower 27 by means not shown for movement upward and downward on the tower in the direction of the arrows indicated in FIG. 2. The main portion of the carriage 29 comprises a hollow casting as more clearly seen in FIG. 7.

Figure 7A:
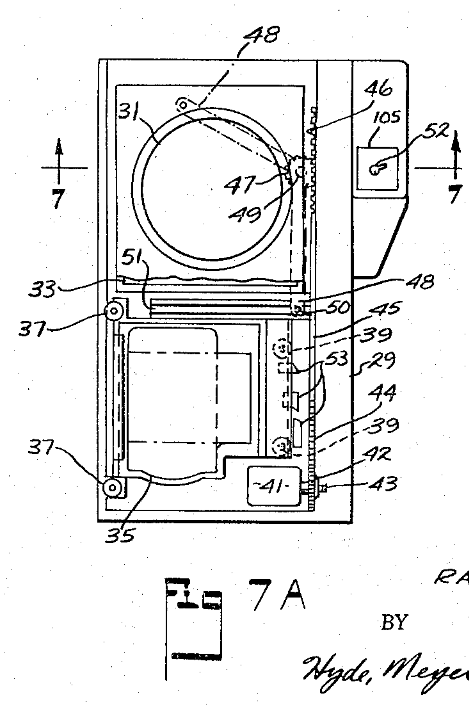
FIG. 7A is a top plan view of the carriage, enlarged, taken along the line 7A—7A of FIG. 2, with parts broken away to more clearly show the interior construction.
Figure 8:
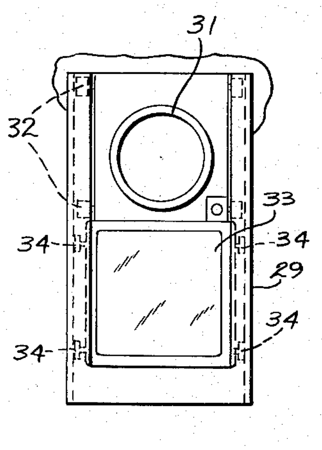
FIGS. 8, 9 and 10 are views taken from the position 7A—7A of FIG. 2 and showing different relative positions of the fluorescent screen, image amplifier, and cassette tray which are mounted in the carriage above the examination table.
Figure 9:
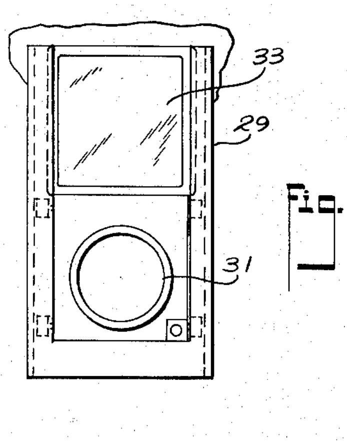
Figure 10:
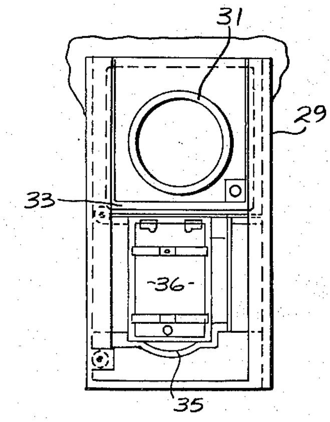
Figure 11:
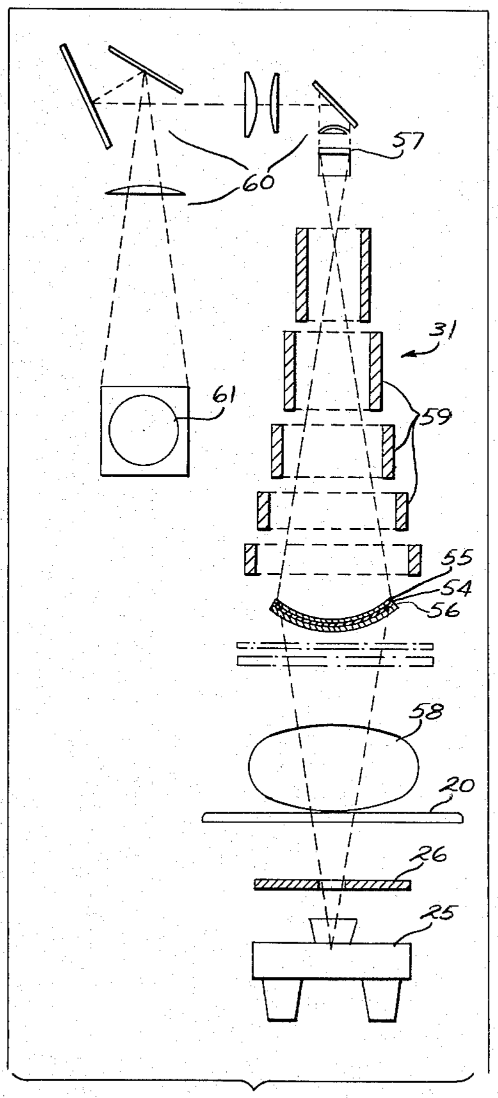
FIG. 11 is a diagrammatic view illustrating the use of the image amplifier with a patient positioned on the examination table.

A fundamental part of the present invention is related to the unitary mounting of certain parts on the carriage 29, of which a clear understanding is more quickly arrived at by considering FIGS. 7, 8, 9 and 10. An image amplifier 31 is mounted by means of rollers 32 in a suitable track which is uppermost in carriage 29 so as to permit sliding or rolling movement of the amplifier from a rearward or inoperative position as shown in FIGS. 8 and 10 to a patient-viewing position as shown in FIG. 9 which is forwardly or on the side where the operator usually stands. Next below the image amplifier is a fluoroscopic screen 33 which is mounted by rollers 34 on a suitable track for movement along the carriage 29 between a rear or inoperative position and shown in FIG. 9 to a patient-viewing position forwardly as shown in FIG. 8. The track for rollers 34 is below the track for rollers 32 as clearly seen in FIG. 7. A cassette tray 35 is provided to hold a film carrying cassette 36 along the length of carriage 29 from a forward position for taking pictures as shown in FIG. 10 to a rearward position not shown in FIGS. 8 and 9 but which will be directly beneath the amplifier 31 in FIG. 8 and beneath the screen 33 in FIG. 9. This cassette tray 35 is shown in its forward position in FIG. 7A. The tray is mounted for rolling movement inside the carriage 29 by means of rollers 37 which engage a track 38 at one side, and by means of rollers 39 which engage a track 40 on the other side.

The operation of the cassette tray 35 in the carriage 28 is functionally exactly like either that described in U.S. Patent No. 2,668,913 granted Feb. 9, 1954 to E. R. Goldfield et al., to which reference may be had for a more complete description, if desired, or like U.S. Patent No. 2,749,445 granted to R. J. Stava et al. on June 5, 1956. Referring to said Patent No. 2,668,913, it is believed sufficient here to state that the tray is driven by means of a small motor 41 mounted in the interior of the carriage and driving a small gear 42 through a very simple friction clutch 43 so as to permit overdrive of the motor. The teeth of gear 42 engage in a rack 44 at one end of a rack bar 45 which is mounted for sliding movement along the carriage 29 in a manner understood from FIG. 7 and FIG. 7A. The opposite end of bar 45 is provided with a rack 46 on the side of the bar as distinct from the rack 44 which is on top of the bar. The rack teeth 46 mesh with a partial gear 47 which is integral with an arm 48 which has a fixed pivot on the carriage at 49. The free end of arm 48 carries a pin 50 which engages in a slot 51 in a channel-like member which forms a portion of tray 35. It should be obvious from a consideration of FIG. 7A that operation of motor 41 in a direction to move the rack bar 45 forwardly will cause the teeth 46 to drive the partial gear 47 and to swing the arm 48 in a clockwise direction from the full and dotted line position of FIG. 7A to the dot-dash position shown there. This will swing the cassette tray 35 to the rearward inoperative position and clearly described in connection with FIG. 9 of the above-mentioned Goldfield et al. patent. A manually controlled member 52, accessible to the operator at the top of the carriage, is provided with suitable connections for placing stop pins which coact with members 53 attached to tray 35 to stop the tray at various picture taking positions all as described in the above-mentioned Goldfield et al. patent. This forms no part of the present invention except that one position of the control member 52 will be later described.

The amplifier 31 is here illustrated as being of the general type shown in U.S. Patent No. 2,606,299 granted August 5, 1952 to J. W. Coltman et al., and U. S. Patent No. 2,555,545, granted June 5, 1951 to R. L. Longini et al., although it will be understood that any other suitable image amplifier can be used in the same location. It should be sufficient to state here that this image intensifier is provided at the input end with an input fluorescent screen 54 in close contiguity to a photoelectrically emissive surface 55, both mounted on a support substantially transparent to X-rays 56. At the other end of the device there is an output phosphor screen 57 adapted to emit light when electrons impinge upon it. In this arrangement, a light image is excited on the fluorescent screen, as by X-rays passing from tube 25 beneath the table through the body of a patient 58 lying on the examination table 20. This in turn generates an electron image on the contiguous photoelectric surface 55. The electrons forming this last-mentioned image are accelerated to high velocity and focused by a condensing electronic lens system 59 on the phosphor screen 57 at the other end of the tube, producing there a light image, preferably of smaller dimensions but of much higher intensity than the light image on the input fluorescent screen 54. This high intensity light image on the phosphor screen 57 is viewed through a suitable lens system 60 to obtain an intensified replica on the viewing mirror 61 of the image excited on the input fluorescent screen 54. The mirror 61 is placed in a convenient position to be seen by an operator standing in front of the examination table.

Figure 12:
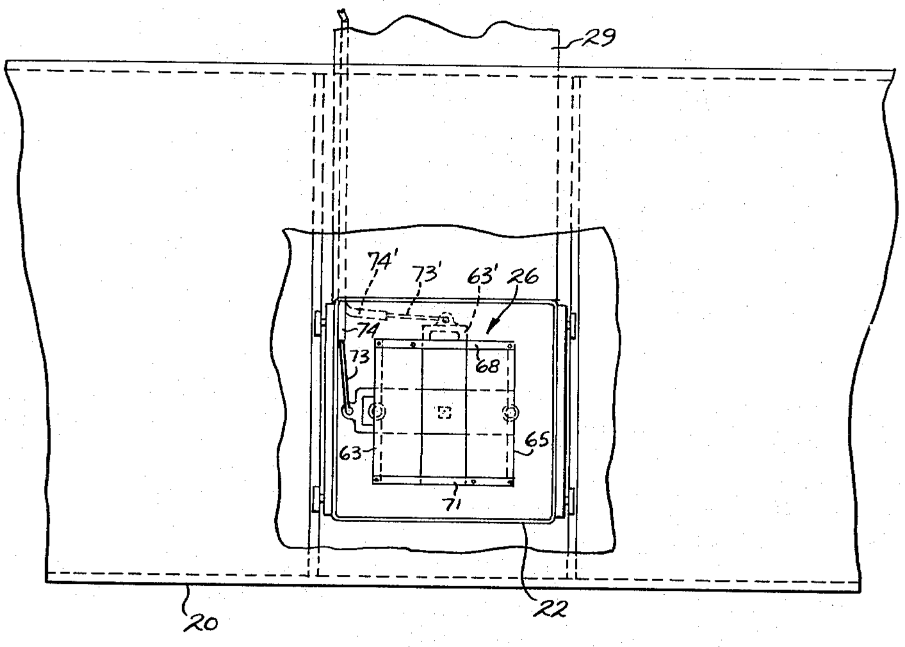
FIG. 12 is a fragmental view taken along the line 12—12 of FIG. 1 with parts broken away to show the beam limiting diaphragms located beneath the examination table.
Figure 13:
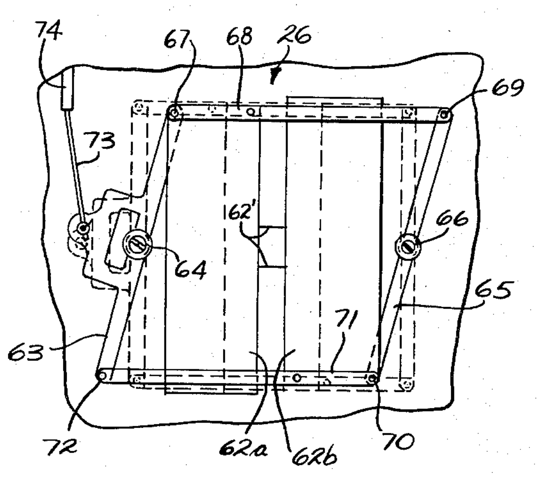
FIG. 13 is a view of a portion of FIG. 12, enlarged, showing another operated position of the parts.

The X-ray beam limiting diaphragms 26, previously mentioned, are located within the carriage 22 beneath the examination table, as previously mentioned. This is a known device and brief reference to FIGS. 12 and 13 will indicate the character of this apparatus. One pair of parallel diaphragms **62*a*, 62*b*, of lead or the like, are supported by a parallel ruler arrangement including a lever 63 having a fixed pivot on the frame at 64 and another at 65 having a fixed pivot on the frame at 66. The diaphragms 62*a* are pivotally connected to lever 63 at the point 67. Also connected at this point is an operating link 68 comprising two parallel link members spaced snugly on opposite sides of the diaphragm 62*b* and pivotally connected to the lever 65 at the point 69. Diaphragm 62*b* is pivotally connected to lever 65 at the point 70. To that same point is pivotally connected an operating link 71 which consists of two parallel members which rest snugly on opposite sides of the diaphragm 62*a* and may or may not be pivotally connected to the lever 63 at the point 72. This parallel ruler arrangement is actuated by means of a Bowden wire 73 which is connected to lever 63 offset from the pivot 64. This Bowden wire 73 runs through the usual embracing conduit 74 to an actuator 75 on the carriage 29 near the operator. Another pair of diaphragms 62' parallel to each other and parallel to the diaphragms 62*a* and 62*b* and spaced slightly below them are operated in an exactly similar way by means of a Bowden wire 73' connected to a lever 63' in all respects similar to the lever 63 previously mentioned. This second set of diaphragms has members having identical functions to lever 65, links 68 and 71. The wire 73' passes through a tube 74' to an operator 75 located adjacent the first-named operator 75**. These diaphragms make it possible for the operator to arrange for the beam to come through squares or rectangles of varying size, as desired.

Figures 14, 15, 16:
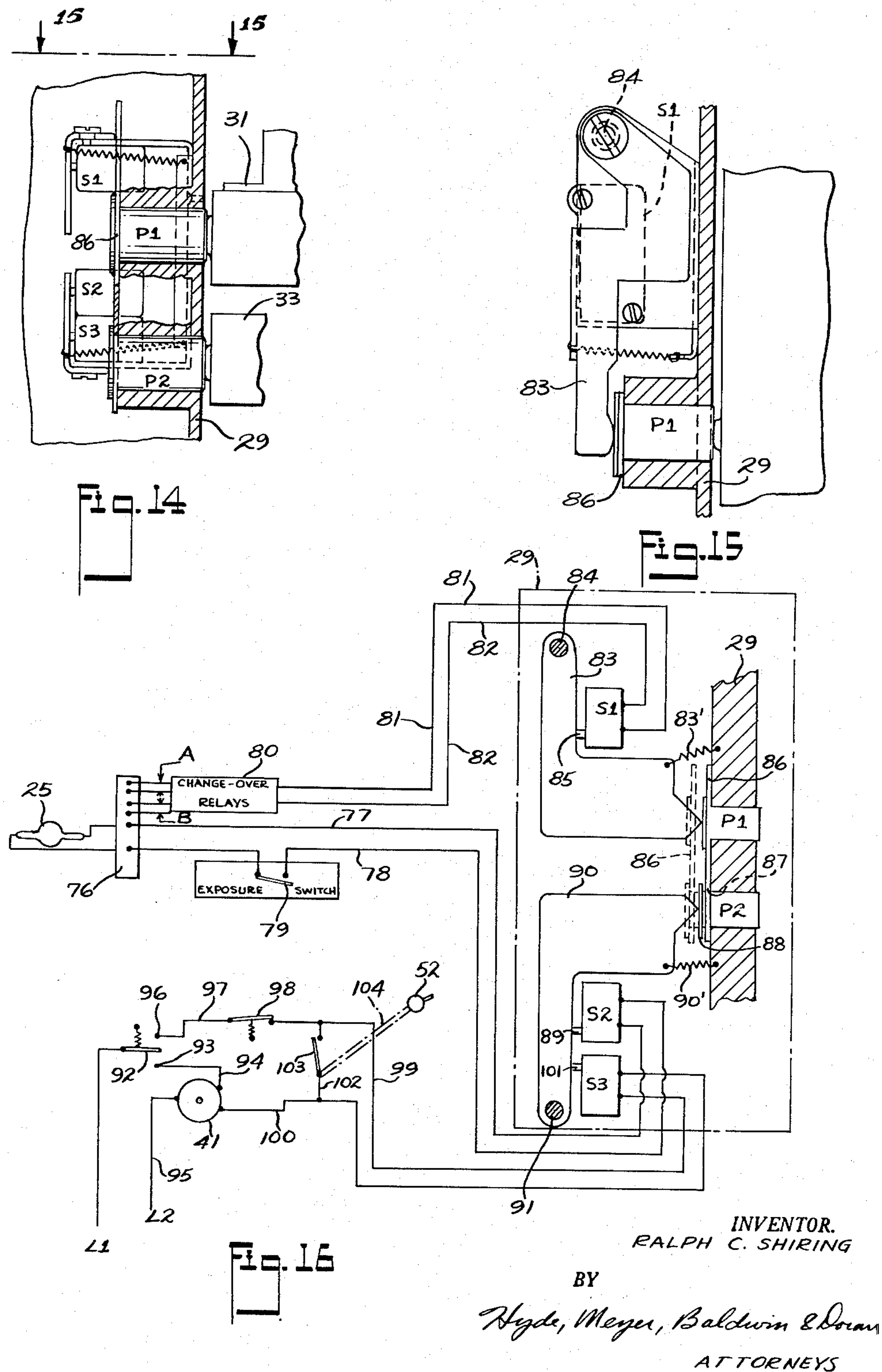

In FIGS. 14, 15 and 16, are shown diagrammatically some control circuits to render the operation substantially automatic when using the amplifier 31, the fluoroscopic screen 33, and the cassette tray 35. The X-ray tube 25 under the examination table is indicated as being connected with the usual energizing and control circuits at 76. Details of these circuits are unimportant and would normally include a high voltage transformer, an autotransformer or the like for the selection of kilovoltage, a rectifier, a filament current supply and the usual control circuits which are well known. The energization of tube 25 is controlled through lines 77 and 78 and the operator-operated switch 79. Lines 77 and 78 are also connected through switch S2 as will presently appear. Connected into the X-ray tube control circuits 76 are circuit parameters indicated here as A and B and controlled by change-over relays at 80. These relays are connected by lines 81 and 82 with a switch S1. This switch may be either normally open or normally closed, as will be understood by those skilled in this art. It is held in a normal or unoperated position by a bellcrank 83 pivotally mounted on the carriage 29 on a fixed pivot 84. This bellcrank normally holds the actuator 85 of the switch S1 in one of its two positions. The position shown in FIG. 16 corresponds to circuit parameter A having circuit values for use in the tube 25 suitable when using the fluoroscopic screen 33. When the amplifier 31 is pulled to the forward or patient-viewing position, a portion of its undercarriage strikes a button P1 slidably mounted in a partition in the carriage 29. This button has secured to its head a plate 86 which extends laterally to a position opposite a second button P2 where the plate 86 is provided with an opening 87 which embraces the button P2 and engages against the head 88 of the button P2. Thus, when the amplifier strikes the button P1, it causes movement of the button P1 to the broken line position of FIG. 16 which moves the bellcrank 83 in a clockwise direction about its pivot 84 and releases the actuator 85 of switch S1. This action automatically switches the circuit through change-over relays 80 from parameter A to parameter B which has circuit values for use in tube 25 which are suitable for the amplifier 31.

Exposure switch 79 and its connecting lines 77 and 78 are so arranged that an exposure cannot be made utilizing tube 25 unless the front opening in the carriage 29 is covered by either the fluoroscopic screen 33 or by the image amplifier 31. To this end, the switch S2 connected in lines 77 and 78 is of the type which normally moves to a closed position but which is held normally open because its actuator 89 is held in this position by a bellcrank 90 which has fixed pivot 91 on the carriage 29. A spring 90' normally holds the bellcrank 90 in the position shown in FIG. 16 just as the bellcrank 83 is held in a similar position by a spring 83'. So long as the amplifier 31 and the fluoroscopic screen 33 are in the rear or inoperative position, an exposure cannot be made because the switch S2 is held open. If the amplifier is pulled forward to strike the pin P1 as previously mentioned, then plate 86 is carried to the broken line position of FIG. 16 and at the same time engages against the bellcrank 90 to swing it in a counterclockwise direction about its pivot 91 and to permit the actuator 89 to close the switch S2. If the fluoroscopic screen 33 is pulled to the forward or patient-viewing position, then a portion of the screen holder strikes the pin P2 as shown in FIG. 14 and this pin, independently of the plate 86, will move the bellcrank 90 to a position permitting switch S2 to close. In either of these conditions, with switch S2 closed, the operator need only actuate the exposure switch 79 to obtain a desired exposure.

Means is provided for loading the cassette tray 35 with a cassette 36 in the front loading position as clearly shown in FIG. 16. Here the motor 41 for operating the cassette tray is supplied with current from source L1, L2. Switch 92 controls the direction of movement of motor 41. The forward movement, to bring the cassette tray to the patient-viewing position, is controlled when switch 92 is against the contact 93 completing a circuit through line 94, motor 41 and line 95. The normal return circuit is energized when switch 92 completes the circuit through contact 96, line 97, normally closed switch 98, line 99, switch S3 in its closed position, line 100, motor 41 and line 95. The switch 98 is normally closed and is held open whenever the cassette tray 35 is in the rearmost position corresponding to the dot-dash position of arm 48 in FIG. 7A. The switch S3 is normally closed but is held open when its actuator 101 is depressed by the bellcrank 90 in the position shown in FIG. 16. Thus, if the cassette tray is in its forward position, and either amplifier 31 or fluorescent screen 33 is moved to the forward position, in either case bellcrank 90 will be moved to a position where actuator 101 allows switch S3 to close thus completing the return circuit through motor 41 to automatically move the tray to the rearward position.

To provide for the front loading of the cassette tray, previously mentioned, a by-pass 102 is provided around switch S3 which is closable by means of a switch 103 which has an operative connection 104 with the control button 52 previously mentioned. When this button is turned to a mark on index plate 105 designated "Front Load," the normally closed switch 103 is placed in open position and locked in that position. Since switch S3 is held open at this time because the parts are in the position as shown in full lines in FIG. 16, return motion of motor 41 is impossible. After the cassette tray has been loaded, then the operator has only to move either the amplifier or the fluoroscopic screen 33 to the patient-viewing position, either of which will permit switch S3 to close, thus completing the return circuit through motor 41 and causing the cassette tray to return automatically to its rearward position.

Figure 4:
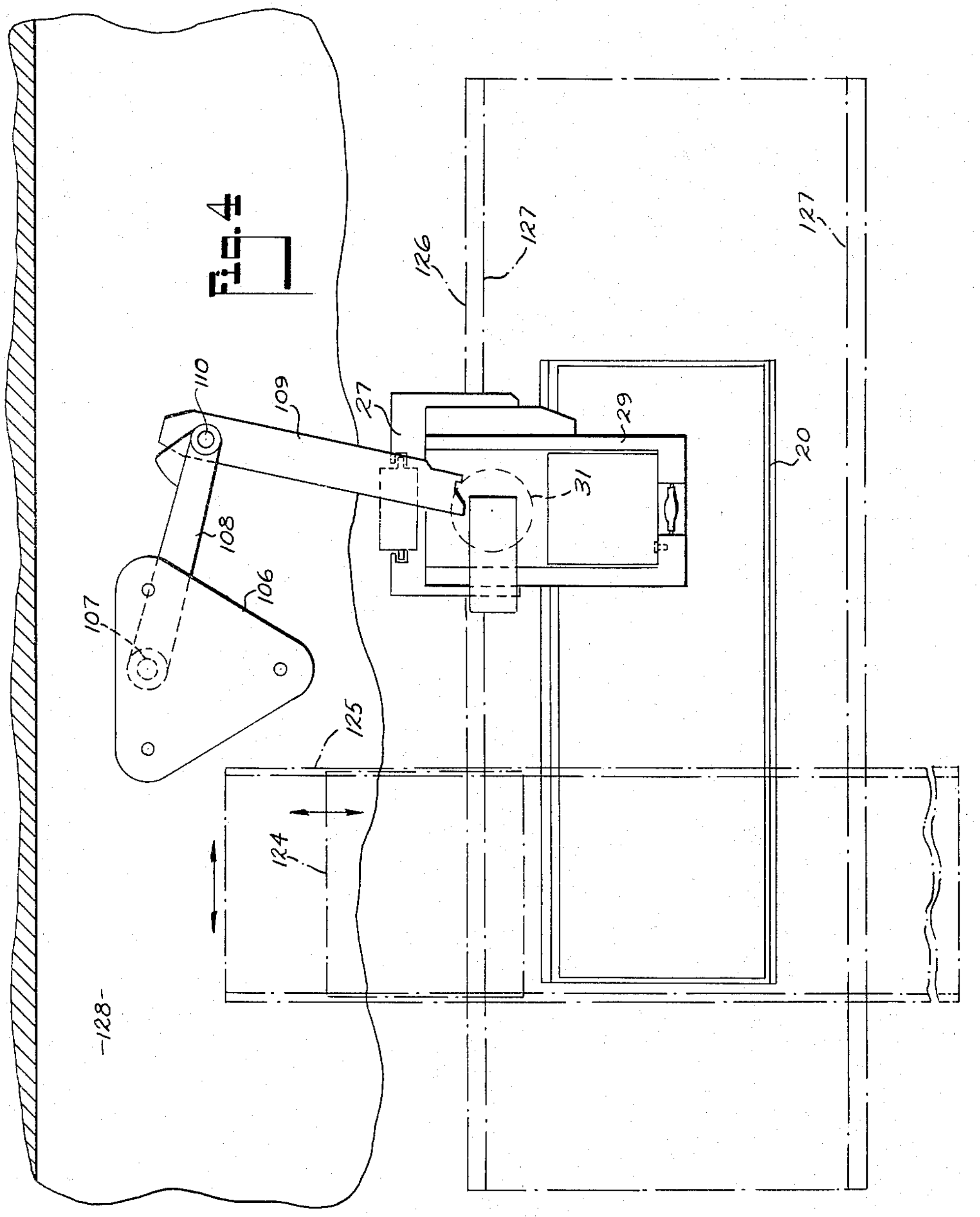
FIG. 4 is a top plan view of the equipment shown in FIG. 1 taken from the level of the ceiling line as indicated at 4—4 on FIG. 1 and with the mounting for the overhead X-ray tube in dot-dash lines to avoid confusion.
Figure 5:
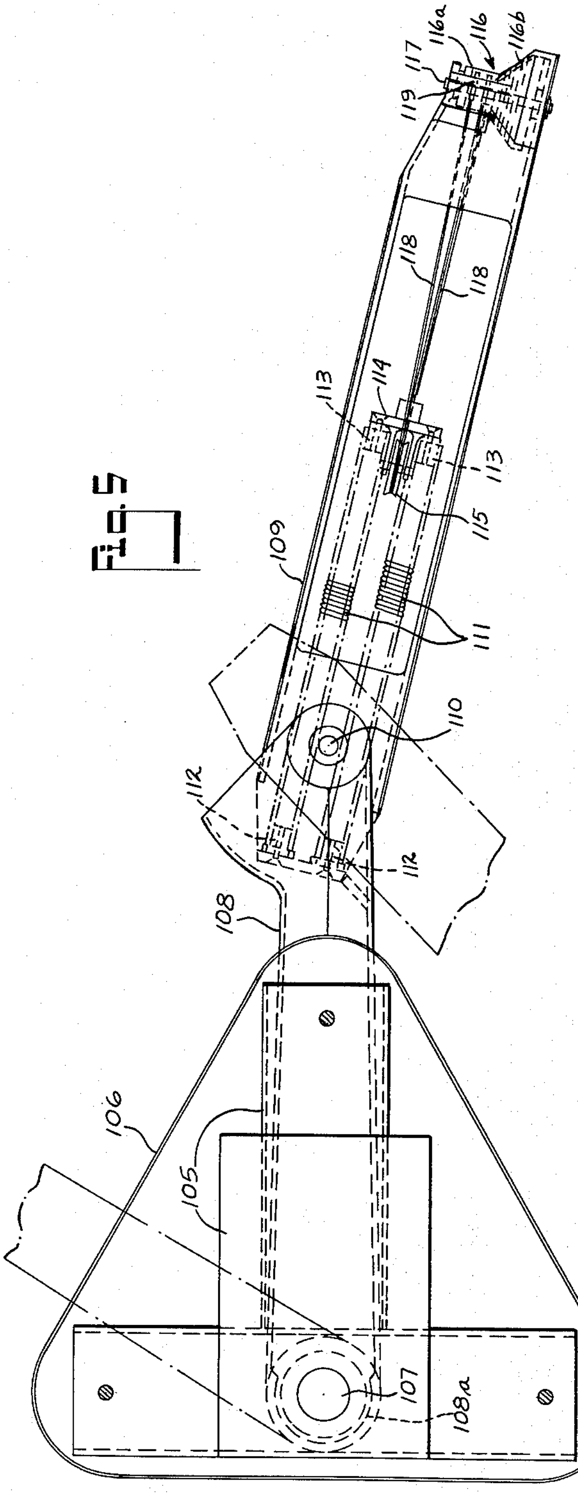
FIG. 5 is a top plan view of the counterbalancing device shown in FIG. 4 but greatly enlarged, and showing the details of the counterbalancing spring means and the pulley and sheave connections with the weight which is counterbalanced.

Because the carriage 29 with the image amplifier 31, and the other equipment thereon is so extremely heavy, it is necessary and desirable to counterbalance this weight so that the operator may easily move the parts up and down on the column or tower 27 when the examination table is in the horizontal position, or to move the tower 27 and carriage 29, and connected equipment up and down the table 20 when in its vertical position as shown in FIG. 3. To this end the invention provides a counterbalancing device overhead where it is out of the way of the operator. Referring now to FIGS. 2, 4 and 5, a generally T-shape base member 105 is secured to the ceiling or other overhead support and concealed in a generally triangular cover 106 for better appearance. In this base member is fixed a pivot shaft 107, on the lower end of which is mounted a first swinging arm 108 by means of a hub **108*a*, there being suitable bearings between the hub 108*a* and the post 107. To the free end of arm 108, there is pivotally connected a second swinging arm 109 connected to arm 108 by pivot pin 110 which has bearings sufficiently spaced along the length of it so that the bending load applied at the outer end of arm 109 causes substantially no deflection in the arms 108 and 109. Again, suitable bearings are supplied at the pivot 110. While a weight might be utilized as a counterbalance, I prefer to use the spring means indicated by the plurality of helical springs 111 enclosed in the interior of the hollow arm 109. At one end, near the pivot 110, the springs 111 are fixed to the end member of the arm 109 by suitable spring retaining members 112. At their radially outer ends, the springs 111 are secured by spring retaining members 113 to a movable yoke 114 which carries centrally thereof, and balanced between springs 111, a pulley 115 rotatably mounted in the yoke 114. At the free outer end of arm 109, is mounted a sheave 116 for rotation about a shaft 117 which extends in the plane generally parallel to the plane of swinging movement of the arm 109. Preferably, this sheave has a generally cylindrical portion 116*a* and a spiral sheave portion 116*b*. A flexible cable 118 has one end fixed at 119 on a bracket near the sheave. This cable then passes around the pulley 115 and back to a point on the periphery of the cylindrical sheave 116*a* where it is secured to the sheave in a manner to be wound onto or off of the sheave portion 116*a* in a manner presently to be described. Another flexible tension cable 120 has its upper end secured to the periphery of the spiral sheave portion 116*b* so that the cable 120 is wound and unwound on cable receiving grooves arranged spirally on the sheave portion 116*b*. The lower end of cable 120 is fixed to the carriage 29 as by attachment to a bracket 121 at the rear end of the carriage, the position of the depending cable 120 being such that it clears all of the apparatus connected with tower 27 and carriage 29 in all positions of the table 20 as it moves between the horizontal and vertical positions. The connections of cables 118 and 120 with their respective sheave portions are so arranged that as springs 111 are extended under tension, cable 118 is wound on sheave portion 116*a* and at the same time the cable 120 is wound from the smaller diameter of sheave portion 116*b* toward the larger diameter portion thereof so that the weight connected to the cable 120 acts on the sheave 116 with a greater lever arm (measured from pivot 117), the greater the load on springs 111. The parts are so calculated and arranged that the increasing moment applied by cable 120 to sheave 116 responds approximately to Hooke's law to apply a greater pull per increment of movement of yoke 114 as the spring 111 becomes more heavily loaded. It will be understood that tower 27 itself, in the position of FIG. 3, is counterbalanced by means enclosed inside of the housing of table 20**.

In order that the apparatus and equipment described heretofore in this specification shall have the maximum usefulness for diagnostic and therapeutic purposes, the same is arranged for use with an X-ray tube 122 mounted above the examination table 20. To this end, the tube 122 is mounted at the lower end of a telescopic arrangement 123 which permits vertical movement of the tube 122 relative to its overhead support. The upper end of the telescopic mounting is carried in a tube support 124, which in turn has a roller mounting on parallel tracks of a movable track member 125, the track of which extends generally crosswise of the X-ray examination table 20. This movable track member 125 is in turn mounted for rolling movement along a stationary track 126 which is secured to the ceiling or other suitable overhead support above the examination table 20. This fixed track member has two parallel tracks 127 extending parallel to each other and generally parallel to the longitudinal axis of the table 20. The movable track member 125 rolls along the tracks 127 so as to arrive at any desired position above the examination table 20. The tube support 124 is then movable along the parallel tracks of movable track member 125 to arrive at any desired position crosswise of the examination table or to one side thereof.

Figure 6:
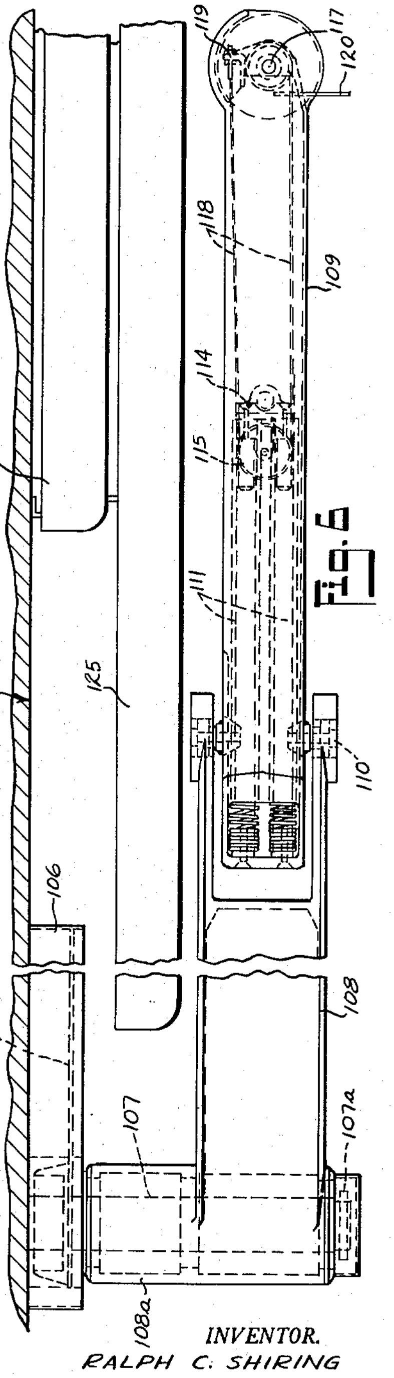
FIG. 6 is a side elevational view of the structure of FIG. 5, together with a portion of the ceiling mounting for the overhead X-ray tube so as to show the clearance of the parts.

Referring now to FIGS. 2 and 6, the overhead X-ray tube support and the counterbalancing means are so arranged that one may be used without interfering with the use of the other. It will be noted that the movable track member 125 is positioned at a level below the ceiling or overhead support 128 such that it is below the mounting 105, 106 which holds the post 107 on which the counterbalancing device is pivoted, and above the plane of movement of the swinging arms 108 and 109 of the counterbalancing device. Referring to FIG. 4, it is thus possible for the movable track member 125 to be moved between opposite sides of the counterbalancing device without interfering therewith. Thus, both the overhead X-ray tube 122 and the tube 25 beneath the examination table are available for use in connection with the patient at any time desired, while at the same time the weight associated with the image amplifier 31 is properly counterbalanced at all times rendering it also available for use.

What is claimed is:

1. An overhead counterbalancing device for a weight at a lower level comprising a support, a first arm having a pivotal mounting on said support, a second arm pivotally mounted on the free end of said first arm, pulley means in one of said arms, spring means operatively associated with said pulley means to urge the latter away from the free end of said second arm, a pulley rotatably mounted near the free end of said second arm, a flexible tension member passing over said last named pulley for connection to a weight to be counterbalanced, and a driving connection between said pulley and said pulley means.

2. An overhead counterbalacing device for a weight at a lower level comprising a support, a first arm having a pivotal mounting on said support, a second arm pivotally mounted on the free end of said first arm, a sheave rotatably mounted near the free end of said second arm, cable means secured to said sheave for drivingly connecting said sheave to a weight below it, radially extending spring means in said second arm having a radial end thereof fixed, cable means connected to the other end of said spring means, and said cable means being windable upon said sheave to load said spring means as said sheave is rotated.

3. An overhead counterbalancing device for a weight at a lower level comprising a support, a first arm having a pivotal mounting on said support, a second arm pivotally mounted on the free end of said first arm, a combined unitary spiral sheave and cylindrical sheave rotatably mounted near the free end of said second arm, cable means secured to said spiral sheave for drivingly connecting said spiral sheave to a weight below it, tension spring means in said second arm extending radially away from the pivotal mounting thereof, the radially inner end of said spring means being fixed to said arm, cable means connected between the radially outer end of said spring means and said cylindrical sheave for loading said spring means by rotation of said sheave in one direction, and said cable means being connected to said spiral sheave to wind toward the end of said spiral sheave of larger diameter as said sheave rotates in said one direction.

4. In combination, an elongated X-ray examination table, a carriage mounted on said table for movement longitudinally therealong, track means on said carriage spaced above the position of a patient on said table and extending laterally of said table, a fluorescent screen having a mounting on said track means, an image amplifier having a mounting on said track means, a film cassette tray having a mounting on said track means, said track means and said mountings permitting said screen and amplifier and cassette tray each to pass the others on said track means, said screen and said amplifier each movable on said track means between a patient-viewing position and an inoperative position, an X-ray tube positioned below said table and directing its rays upwardly toward said patient-viewing position on said carriage, an electrical energizing circuit for said tube, switch means on said carriage and connected with said circuit to normally cause de-energization of the latter, and means operatively connected between said screen and said amplifier respectively when each said screen and said amplifier is in patient-viewing position for causing circuit-energizing movement of said switch.

5. In combination, an elongated X-ray examination table, a carriage mounted on said table for movement longitudinally therealong, track means on said carriage spaced above the position of a patient on said table and extending laterally of said table, a fluorescent screen having a mounting on said track means, an image amplifier having a mounting on said track means, a film cassette tray having a mounting on said track means, said track means and said mountings permitting said screen and amplifier and cassette tray each to pass the others on said track means, said screen and said amplifier each movable on said track means between a patient-viewing position and an inoperative position, an X-ray tube positioned below said table and directing its rays upwardly toward said patient-viewing position on said carriage, an electrical energizing circuit for said tube, electric motor means operatively connected with said tray to move the same on said track means between a patient-viewing position and an inoperative position, a first electrical circuit for energizing said motor means to drive said tray in a first direction toward said patient-viewing position, a normally closed second circuit for energizing said motor means to drive said tray in a second direction toward said inoperative position, said second circuit having two lines in parallel, a first operator-controlled switch settable in an open position in one of said lines, a second switch in the other of said lines normally holding the same open, and means operatively connected between said screen and said amplifier respectively when each said screen and said amplifier is in patient-viewing position for causing closing of said second switch.

6. The combination of claim 5 including a normally closed third switch in said second circuit, an means operatively connected with said tray for opening said third switch only when said tray is in said inoperative position.

7. An overhead counterbalance system for balancing at least part of the weight of an X-ray examining device mounted on a carriage system of an X-ray examination tilting table having a ceiling-mounted radiographic X-ray tube over said table; said counterbalance system comprising at least one swinging arm pivotally mounted clear of said ceiling mounting radiographic tube support and allowing free movement of said tube support to all required radiographic positions over and around the X-ray examination table.

8. In an X-ray apparatus having a table and a relatively movable tower carried thereby, a carriage reciprocally carried on the tower, said carriage including longitudinally disposed track means, an image transmission housing movably carried by said track means and having an image position and a storage position, and X-ray responsive visual image producing means movably carried by the track means and having an image position and a storage position, said housing and visual image producing means each being selectively movable along said track means past one another and being selectively and alternately positionable in their respective image positions.

9. The device of claim 8 wherein said visual image producing means is an apparatus for holding an X-ray film in position to be exposed.

10. In an X-ray aparatus having a table and a relatively movable tower carried thereby, a carriage reciprocally carried on the tower, said carriage including longitudinally disposed track means, an image transmission housing movably carried by said track means and having an image position and a storage position, first and second X-ray visual image producing means movably carried by the track means, each of said visual image producing means having an image position and a storage position, and said housing and said first and second visual image producing means each being selectively movable along said track means past one another and being selectively and alternately positionable in said respective image positions.

11. The device of claim 8 wherein a camera is carried by the image transmission housing.

12. The device of claim 8 wherein said transmission housing houses an image amplifier tube.

13. In combination with an X-ray table having a relatively movable tower and a film tray the improvement which comprises, a carriage reciprocatably carried on the tower, X-ray responsive image producing means carried by the carriage, overhead counterbalance means supported above the table and having an arm movable in a path of travel, force transmission connection means connecting the counterbalance to the carriage to transmit the weight of the carriage and image means to the counterbalance and causing said arm to move in its path of travel in response to movement of said carriage, an overhead supported tube stand carriage movable in a path of travel, a tube stand supported by said carriage for support of X-ray apparatus, said tube stand carriage path of travel and said counterbalance arm path of travel being independent of one another to permit simultaneous unobstructed movement, and at least a substantial portion of said arm path of travel being disposed between said tube stand carriage path of travel and said table.

14. In combination, an X-ray examination table including mounting means permitting tilting of said table into various positions between horizontal and vertical, an X-ray tube positioned below said table and directing its rays upwardly, means mounting a fluorescent screen on said table for movement relative thereto, means mounting an image amplifier on the table for movement relative thereto, said two means being constructed and arranged to selectively position said screen and said amplifier in registration with the central beam of the X-rays emanated by said tube beneath the table, each of said means being radially movable into and out of said registration positions without interference with the other of said means, a track fixed to an overhead support above said table, a tube supporting member movably mounted on said track for movement in a path along a horizontal level at a fixed distance below the overhead support, a second X-ray tube mounted on said tube supporting member, a counterbalancing means connected to said image amplifier to counterbalance the amplifier in all positions of the table, said counterbalancing means including a swingable arm having a pivotal mounting fixed relative to the overhead support and holding the arm for movement in a horizontal plane other than at said horizontal level, said last named pivotal mounting having its sole connection with said overhead support at a point outside said path of movement of said tube supporting member, said counterbalancing means including a counterbalance and a flexible tension member connected between the counterbalance and the carriage, a pulley support for said tension member carried at the outer end of said arm, and said second tube mounting means and said counterbalance means having mutual clearance permitting the tube mounting means to move between positions on opposite sides of the counterbalancing means.

15. In combination, an elongated X-ray examination table, a carriage mounted on said table for movement longitudinally therealong, track means on said carriage spaced above the position of a patient on said table and extending laterally of said table, a fluorescent screen having a mounting on said track means, an image amplifier having a mounting on said track means, and said track means and said mountings permitting said screen and amplifier to pass each other on said track means, said screen and said amplifier each movable on said track, means between a patient-viewing position and an inoperative position, an X-ray tube below said table and directing its rays upwardly toward said patient-viewing position on said carriage, an electrical energizing circuit for said tube including a first parameter having screen-use valves, and a second parameter having amplifier-use valves, a switch means for causing connection of said first parameter in said circuit only when said screen is in patient-viewing position and for causing connection of said second parameter in said circuit only when said amplifier is in patient-viewing position.

References Cited in the file of this patent

UNITED STATES PATENTS

| | | |
|---|---|---|
| 2,552,858 | Mueller et al. | May 15, 1951 |
| 2,700,524 | Lauterbach | Jan. 25, 1955 |
| 2,812,687 | Eitel et al. | Nov. 12, 1957 |
| 2,822,477 | Kizaur | Feb. 4, 1958 |
| 2,833,504 | Sacksteder | May 6, 1958 |
| 2,841,714 | Vaughn | July 1, 1958 |
| 2,874,300 | Alphen et al. | Feb. 17, 1959 |